(12) United States Patent
Bernard et al.

(10) Patent No.: US 7,881,513 B2
(45) Date of Patent: Feb. 1, 2011

(54) METHOD FOR THE PROCESSING OF RADIOLOGY IMAGES FOR A DETECTION OF OPACITIES

(75) Inventors: Sylvain Bernard, Montigny le Bretonne (FR); Serge Louis Wilfrid Muller, Guyancourt (FR); Razvan Gabriel Iordache, Paris (FR); Gero Peters, Paris (FR)

(73) Assignee: General Electric Company, Schenectady, NY (US)

( * ) Notice: Subject to any disclaimer, the term of this patent is extended or adjusted under 35 U.S.C. 154(b) by 858 days.

(21) Appl. No.: 11/828,451

(22) Filed: Jul. 26, 2007

(65) Prior Publication Data

US 2008/0037853 A1  Feb. 14, 2008

(30) Foreign Application Priority Data

Aug. 11, 2006 (FR) .................................. 06 53369

(51) Int. Cl.
*G06K 9/00* (2006.01)
(52) U.S. Cl. ........................ 382/128; 382/130; 382/131; 382/132; 382/133; 382/181; 382/224; 382/227; 382/282; 382/260; 382/305; 378/37; 378/21; 378/23; 706/12; 706/16; 600/300
(58) Field of Classification Search ................. 382/128, 382/131, 132, 155, 156, 206, 205, 256, 257, 382/260, 272; 378/37; 706/13, 37, 4; 600/300, 600/400
See application file for complete search history.

(56) References Cited

U.S. PATENT DOCUMENTS

| | | | |
|---|---|---|---|
| 5,627,907 A * | 5/1997 | Gur et al. ..................... | 382/132 |
| 6,064,768 A | 5/2000 | Chin et al. | |
| 6,205,236 B1 * | 3/2001 | Rogers et al. ............... | 382/132 |

(Continued)

FOREIGN PATENT DOCUMENTS

EP 0 627 695 12/1994

(Continued)

OTHER PUBLICATIONS

Veldkamp et al "Accurate segmentation and contrast measurement of micro calcifications in mammograms: A phantom study"; Jul. 1998.*

(Continued)

*Primary Examiner*—Wesley Tucker
*Assistant Examiner*—Nancy Bitar
(74) *Attorney, Agent, or Firm*—Global Patent Operation; Jonathan E. Thomas (57) ABSTRACT

In a method for the processing of radiological images for the detection of opacities in a radiography image, an algorithm is proposed for detecting opacities according to their contrasts. To determine a contrast that is not over-estimated in each element, an algorithm is proposed for computing the background intensity by means of a sliding-window filtering. This type of sliding-window filtering computes the set of mean values of grey levels about an immediate environment of a region of elements whose size depends on the size of the opacity to be detected. The algorithm considers a background intensity of the region of elements to be the lowest mean value grey levels among the set of mean values of grey levels.

8 Claims, 4 Drawing Sheets

U.S. PATENT DOCUMENTS

| | | | |
|---|---|---|---|
| 6,275,391 | B1 | 8/2001 | Laskai et al. |
| 7,450,689 | B2 * | 11/2008 | Soto .......................... 378/101 |
| 2003/0103663 | A1 * | 6/2003 | Li et al. ...................... 382/131 |

FOREIGN PATENT DOCUMENTS

| | | |
|---|---|---|
| FR | 2847698 | 11/2002 |
| FR | 2 863 749 | 6/2005 |
| WO | WO 00/79474 | 12/2000 |
| WO | WO 03/101303 | 12/2003 |

OTHER PUBLICATIONS

Bernard et al.; Microcalcification Detection on Simple Back-Projection Reconstructed Slices Using VVaveletes; International Journal of Computer Assisted Radiology and Surgery; A Journal for Interdisciplinary Research, Development and Applications of Image Guided Diagnosis and Therapy, Springer-Verlag, BE, vol. 1. No. SUPPL 1, 2006. pp. 84-86.

Bernard S et al.; Fast microcalcification detection on digital tomosynthesis datasets; Progr. Biomed. Opt. Imaging Proc. Spie; Progress in Biomedical Optics and Imaging—Proceedings of Spie; Medical Imaging 2007: Computer-Aided Diagnosis 2007, vol. 6514, No. PART 2; Mar. 2007.

Dikansky et al., Modulator for Klystron 5045; Budker Institute of Nuclear Physics, Novosibirsk 630090, Russia.

VLF Thumper Product Information Sheet, Very Low Frequency AC Hipot & Capacitor Discharge Unit, Copake, NY 12516 USA.

Bowen et al., The Ferratron: A High-Voltage, High Rep-Rate, Low Jitter, UWB Switch with A Ferroelectric Trigger; Switching Notes, Note 29; Mar. 1999.

Bieler, M.; Laser Triggered HV-Switch with Wide Voltage Range; 1987; CH2387-9/87/0000-1630; Institut fur Experimentalphysik der Universitat Hamburg, W. Germany.

Rodriguez et al., Triggering and guiding megavolt discharges by use of laser-induced ionized filaments; Optics Letters, vol. 27, No. 9, May 2002; Optical Society of America.

* cited by examiner

METHOD FOR THE PROCESSING OF RADIOLOGY IMAGES FOR A DETECTION OF OPACITIES

FIELD OF THE INVENTION

The field of the present invention relates to medical imaging and, more particularly, that of mammography. An embodiment of the invention provides a method for the processing of radiology images for the detection of radiological signs. An embodiment of the present invention also provides a medical image reviewing station configured to execute an image-processing method of this kind.

DESCRIPTION OF THE PRIOR ART

Today, mammography is widely used for the detection of lesions and the prevention of breast cancer. The signs to be detected in mammography images are radiological signs associated with lesions. These signs may be either calcium deposits or cases of opacity. Calcium deposits are called microcalcifications and individually form small-sized elements (ranging from 100 µm to 1 mm in diameter) that are more opaque to X-rays than the surrounding tissues. Opacities are dense regions where the X-rays are absorbed more intensely than in the adjacent regions. An opacity often has a dense core with a likelihood of spicules converging toward the core.

Today it is still difficult, even for practitioners, to visually detect opacities in standard radiography images. Indeed, in such images, the shape of the opacities is not clearly defined and their contrast is often low. To help resolve the problems of detecting opacities, there are mammography devices in the prior art that comprise image-processing methods that make it easier for the radiologist to detect lesions. These devices comprise systems of computer-aided detection or CAD.

The detection system is used to read and analyze a preliminarily digitized radiography image film for the extraction, from this film, of suspect zones potentially corresponding to the presence of a lesion. This detection system gives localizing information on the lesions.

However, these devices have drawbacks. In such devices the processing method is performed on digitized radiology films, thus adding a digitization noise to the natural presence of noise in the image to be processed. The increase in noise makes it more difficult to detect opacity elements.

Furthermore, with this type of lesion detection system, it can happen that certain opacities are not spotted. This phenomenon has many causes. In particular, since the mammography images are the result of projections, they represent superimposed structures that disturb the visibility of the structures of the breast, sometimes leading either to a falsely positive interpretation when a superimposition of these structures resembles opacity or to a falsely negative interpretation when the structures obscure the visibility of a lesion.

To resolve this problem of falsely negative or falsely positive interpretation, there are devices in the prior art used to automatically locate lesions from a contrast image. This type of device and the results obtained with this type of device are illustrated in FIGS. 1, 2a, 2b, and 3.

Figure 1:
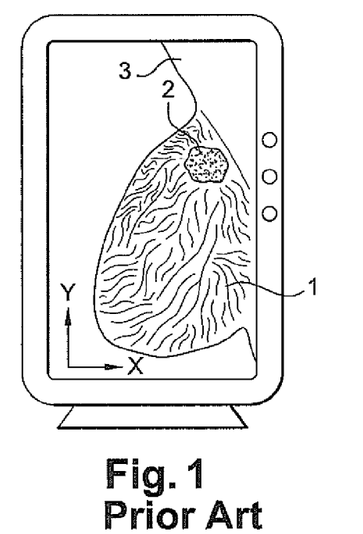
FIG. 1, already described, is a schematic view of the radiological raw image of a patient's breast.

FIG. 1 shows a raw image 1 corresponding to the breast of the patient subjected to radiography. This raw image 1 is produced from signals given by detector of an X-ray apparatus. The raw image 1 has a heterogeneous texture. In the example of FIG. 1, the raw image has an opacity 2. This opacity 2 is situated close to the boundary between the breast and the pectoral muscle 3.

For each element of the raw image, the device computes a contrast that characterizes it. The means of computation of the contrast of the elements are formed by a wavelet filter designed to react strongly to the presence of structures having a given dimension and shape. Consequently, the raw image is converted into an image of contrasts that is defined for each element of the breast.

Figure 2A:
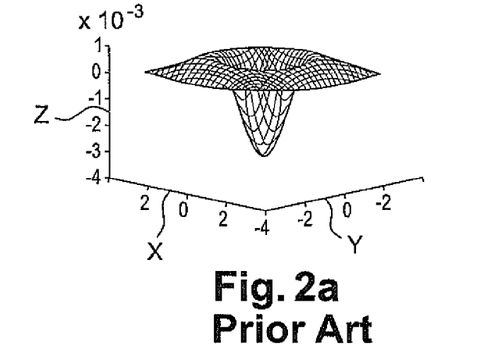
FIG. 2a, already described, is a schematic view of an inverted Mexican-hat type wavelet filter.

FIG. 2a shows a 3D schematic view of the wavelet filter with the scale parameter s. The wavelet filter is of the inverted Mexican hat type.

The wavelet filter is represented, in the example of FIG. 2, on the X, Y and Z Cartesian coordinates. The wavelet filter is translated to the plane defined by the X and Y axes. The Z axis represents the amplitude of the wavelet filter.

A family of wavelet filters is defined, for application to the raw image in order to compute the contrast for each size of a predefined range of size of opacities. The device arbitrarily chooses the scale depending on the predefined size of the opacity.

Figure 2B:
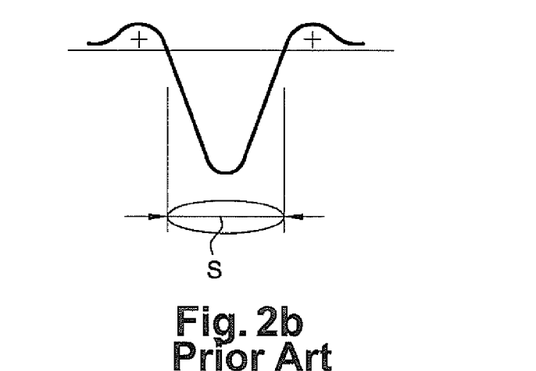

FIG. 2b shows a section view in the plane (X, Z) of the wavelet filter of FIG. 2a according to the scale s. Each wavelet filter defined by the control logic unit measures the contrast of each pixel of the raw image, as a function of the scale parameter s. The wavelet filter has a central part formed by negative coefficients and a positive part located on the periphery. The greatest radius of the negative part is equal to the value of the scale of the filter.

The equation of the wavelet filter is given in polar coordinates by the following equation where r is the radius variable:

$$f_s(r) = -\left(1 - \frac{r^2}{s^2}\right) \cdot e^{-\frac{r^2}{s^2}}$$

where s is the scale of the filter

During the convolution of the raw image with the wavelet filter, the control logic unit computes, at each pixel having coordinates (x, y) of the raw image, a mean of the gray levels neighboring (x, y) weighted by the absolute value of the negative coefficients of the filter and a mean of the gray levels neighboring (x, y) weighted by the positive coefficients of the filter. The mean of the gray levels present in the negative part represents the mean of the gray levels in the part presumed to be an opacity part. The means of the gray levels present in the positive part represents the mean of the gray levels of the presumed background part surrounding the presumed opacity.

Finally, the control logic unit computes the contrast of said element in taking the difference between these two mean values. The use of the wavelet filter enables a computation of linear contrast in taking a difference between the mean values of gray levels.

Figure 3:
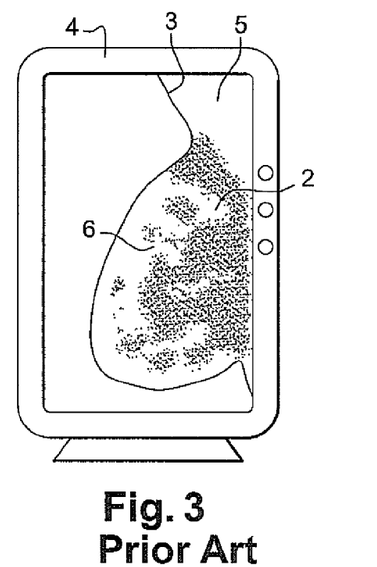
FIG. 3, already described, is a schematic view of the raw image filtered by the wavelet filter of FIGS. 2a and 2b.

However, this type of device has drawbacks. These drawbacks are shown in FIG. 3. FIG. 3 shows the filtered image 4 obtained with the wavelet filtering shown in FIGS. 2a and 2b. In this filtered image 4, strong responses are obtained not only in the opacity sector 2 but also at the boundary 5 between the pectoral muscle 3 and the breast, at the transition 6 between the sectors comprising mainly the gland and the sectors comprising mainly fat.

With all these strong responses obtained in the filtered image 4, the device is not capable of distinguishing an opacity from a non-suspect zone. Now, the drawback of these devices is that they tend to be a substitute for the radiologist in the interpretation of the image, especially as regards the distinction between malignant elements and benign elements.

SUMMARY OF THE INVENTION

The invention is aimed precisely at overcoming the drawbacks of the techniques explained here above. To this end, the invention proposes an image-processing method used to detect opacities in a radiography image as a function of their contrasts. To do this, embodiments of the invention implement novel methods of computing the contrast of the opacities.

With this image-processing method, the opacities are easier to identify, thus enabling more efficient examination.

An embodiment of the present invention proposes an algorithm for the detection of the opacities applied directly to the data given by the digital detector and not to the digitized radiology films as in the prior art. This eliminates the noise introduced by the digitizing method.

Furthermore, the structures to be sought in the raw image are fairly large objects with sizes of 50 to 300 elements. It is therefore not necessary to analyze the image with high resolution. The image will therefore be converted in to an image of lower resolution. This will considerably reduce the computation time needed to detect opacity elements. The raw image is consequently divided into contiguous blocs of elements of the image. The under-resolved image is formed by macro-elements with the mean of the grey levels of each corresponding block.

The making of embodiments of the invention has highlighted the fact that the estimation of the background intensity $I_b$ as the mean value of grey levels measured in the close neighborhood of a region of macro-elements leads to an over-estimation of the contrast of the region. This over-estimation of the contrast of the region of elements may lead to cases of false detection. To resolve this problem, the invention implements an algorithm for the computation of background intensity giving an improved estimation of the background intensity $I_b$ leading to an improved estimation of the contrast of the elements of the image.

This algorithm for computation of the background intensity $I_b$ is implemented by means of sliding-window filtering. This type of sliding-window filtering computes all the mean values of grey levels in an immediate environment of the region of elements. The algorithm determines a background intensity $I_b$ to be assigned to the region of elements from the set of mean values of grey levels computed in this immediate environment $I_b$. This determining is done as a function of criteria enabling an improved estimation of the contrast of the regions of elements. Preferably, the background intensity $I_b$ is estimated as the minimum mean value of grey levels, measured in the immediate environment of the region of elements.

The use of these sliding windows to compute the background intensity $I_b$ facilitates the algorithm while at the same time reducing the computation time in an embodiment of a method of the invention.

The invention also proposes techniques of digital processing of the radiology image capable of improving the readability of information. To do this, the invention produces a display of the projection image in which the opacities are enhanced or colored and/or optionally the identified opacities are marked and/or surrounded by a contour.

The algorithm of the invention is thus capable of accelerating the search for opacities while at the same time increasing the visibility of the results. The method of the invention thus highlights all the opacities that appear on the image without distinction, whether these signs are benign or malignant.

Embodiments of the invention also relate to a device for configured to implement said radiology image processing method for a detection of opacities.

BRIEF DESCRIPTION OF THE DRAWINGS

Embodiments of the invention will be understood more clearly from the following description and the accompanying figures. These figures are given by way of an indication and in no way restrict the scope of the invention.

FIG. 2b, already described, is a schematic view of a section in the plane (X, Z) of the wavelet filter of FIG. 2a.

DETAILED DESCRIPTION OF EMBODIMENTS OF THE INVENTION

Figure 4:
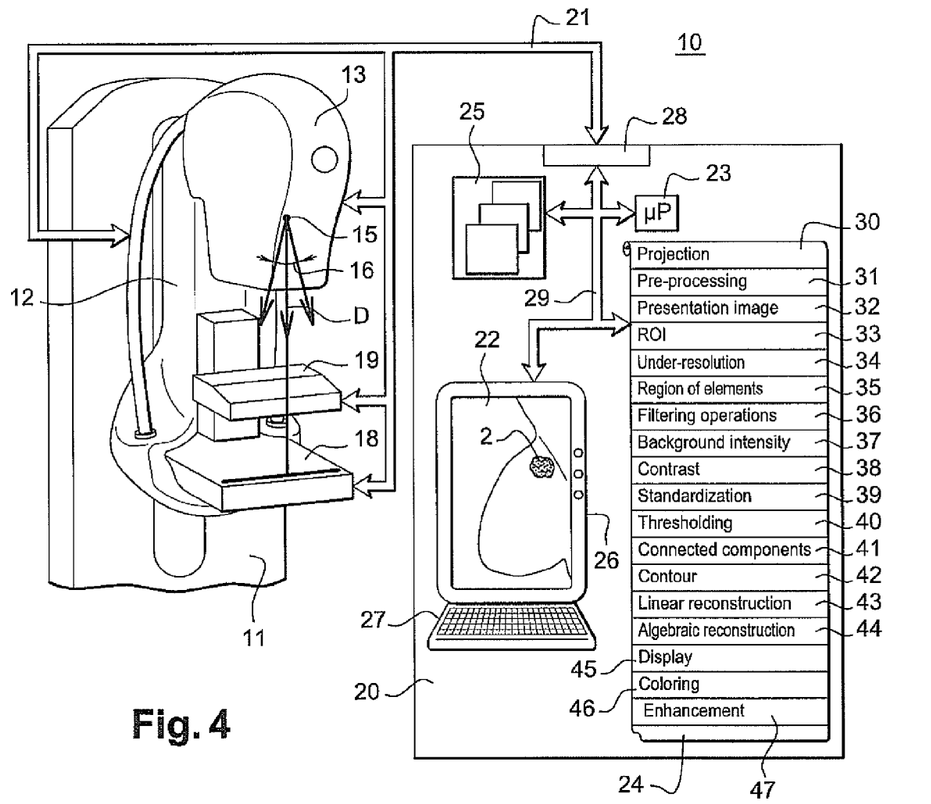
FIG. 4 is a schematic view of an X-ray device, especially a mammography machine, provided with the improved means of the invention.

FIG. 4 shows an X-ray device, especially a mammography machine, according to the invention. This X-ray device 10 has a vertical column 11. On this vertical column 11, there is a hinged arm 12 bearing an X-ray-emitting tube 13 and a detector 14 capable of detecting the X-rays emitted by the tube 13. This arm 12 may be oriented vertically, horizontally or obliquely. The tube 13 is provided with a focus 15 which is the X-ray emitting focus. This focus 15 emits an X-ray beam 16 along the direction of emission D.

At present there are several types of mammography projection images which have standardized terminology. For mammography screening, generally a cranio-caudal and an oblique medio-lateral projection are performed on each breast. The arm 12 shifts the tube 13 to predefined positions to obtain a cranio-caudal and/or oblique medio-lateral projection for each breast.

In an example, the detector 14 is a digital detector. The detector 14 is hooked to the arm 12 opposite the tube 13 and in the direction of emission D, so as to receive the X-ray beam 16.

The arm 12 is provided with a breast-holder tray 18 on which a patient lays her breast. This breast-holder tray 18 is placed on top of the detector 14. The detector 14 is placed beneath the breast-holder tray 18. The detector 14 detects the X-rays that have crossed the patient's breast and the breast-holder tray 18.

Furthermore, for reasons related both to the immobilizing of the breast and to image quality or intensity of X-rays delivered to the patient's breast, it is necessary to compress the patient's breast during the radiography. Various compression forces may be applied. These forces are applied through a compression pad 19 which compresses the breast on the breast-holder tray 18 as a function of the type of examination to be made.

To this end, the arm 12 has a pad 19 that is a sliding pad capable of being made to compress the breast either manually or in being motor-driven. The pad 19 is made out of an X-ray transparent material, for example plastic. The arm 12 therefore bears the following vertically: starting from the top, the X-ray tube 13, the compression pad 19, the breast-holder tray 18 and the detector 14.

While the pad 19, the patient's breast, the tray 18 and the detector 14 are fixed, the X-ray tube 13 may take up various positions in space relative to this assembly.

In one variant, the detector 14 may be mobile and may take up various positions around the breast at the same time as the X-ray tube 13. In this case, the detector 14 is no longer fixedly joined to the breast-holder tray 18. The detector 14 may be flat or curved. It may be shifted rotationally and/or in translation.

After having received the beam 16 which crosses a part of the patient's body, the detector 14 emits electrical signals corresponding to the energy of the rays received. These electrical signals may then be transmitted to a control logic unit 20 by means of an external bus 21. These electrical signals enable this control logic unit 20 to produce a 2D raw image corresponding to the part of the body X-rayed.

In a preferred embodiment, the coloring or the enhancing of the intensity of the elements liable to constitute opacities is done on an image known as a presentation image 22 that can be viewed by the radiologist, distinct from the raw image but obtained from it.

This presentation image can be displayed by means of a screen 26 of this control logic unit 20 or it may be printed.

In one example, the control logic unit 20 comprises a microprocessor 23, a program memory 24, a data memory 25, a display screen 26 provided with a keyboard 27 and an output/input interface 28. The microprocessor 23, the program memory 24, the data memory 25, the display screen 26 provided with a keyboard 27 and the input/output interface 28 are interconnected by an internal bus 29.

In practice, when a device is said to have performed an action, this action is performed by a microprocessor of the device controlled by instruction codes recorded in a program memory of the device. The control logic unit 20 is such a device. The control logic unit 20 is often made in integrated-circuit form.

The program memory 24 is divided into several zones, each zone corresponding to instruction codes in order to fulfill a function of the device. Depending on variants of the invention, the memory 24 has a zone 30 comprising instruction codes to set up a predefined position of the tube and command an emission of X-rays at this position. The instruction codes of this zone 30 produce an image from the signal given directly by the detector. The memory 24 has a zone 31 comprising instruction codes to carry out a pre-processing on this image in order to correct artifacts due to the acquisition geometry and to the detector, thus producing an image known as a raw image.

The memory 24 has a zone 32 comprising instruction codes for the production, from the raw image, of an image known as a presentation image on which elements that could be opacities will be enhanced or colored after having been detected on the raw image.

This presentation image is obtained by another processing method from the raw image. An example of a processing method of this kind is described in the document FR 28 47 698. The document FR 28 47 698 describes a method of management of the dynamics of a digital radiology image. This method is used to adapt the variations of the gray levels in order to display an image whose appearance enables reading on the entire span of the patient's breast, including in the dense zones.

The memory 24 has a zone 33 comprising instruction codes for repositioning the raw image on the region of interest (ROI), i.e. the region of the image containing only the patient's breast. For the raw image, it then defines a region of interest including a minimum of artifacts, in using prior knowledge of the acquisition geometry. It also makes it possible to gain time in performing computations solely on the region of interest.

The memory 24 has a zone 34 comprising instruction codes to make the raw image pass into under-resolution. The raw image is divided into contiguous blocs of elements of the image. The under-resolved image is formed by macro-elements comprising a mean of the grey levels of each corresponding block.

The memory 24 has a zone 35 comprising instruction codes for the association, in the raw image, of the macro-elements in regions of elements as a function of the size of the opacity to be detected. It also takes a mean of the grey levels in the region of elements.

The memory 24 has a zone 36 comprising instruction codes for the application, to each region of elements, of a sliding-window filtering operation in order to compute the set of mean values of grey levels in an immediate environment of each region of elements. The memory 24 has a zone 37 comprising instruction codes for the determining, for each region of elements, of the mean value of grey levels to be considered as the background intensity $I_b$ among all the mean values of grey levels computed here above.

The memory 24 has a zone 36 comprising instruction codes to compute the contrast of each region of elements as a function of the estimated background intensity $I_b$. The memory 24 has a zone 36 comprising instruction codes to standardise the contrast computed as a function of the corresponding estimated background intensity $I_b$ and of the size of the opacity to be detected.

The memory 24 has a zone 40 comprising instruction codes to perform a thresholding of the raw image in comparing the standardised contrast of each region of elements with a standardised contrast threshold of predefined opacity. The instruction codes of the zone 40 assign an opacity attribute to the elements of the region of elements whose standardised contrast is greater than this contrast threshold. It assigns all the other elements that do not meet this condition an attribute of non-opacity. An attribute of opacity or of non-opacity is a temporary and internal parameter of the control logic unit. In one example, the attribute may be a graphic annotation or a binary number.

The memory 24 has a zone 41 comprising instruction codes to apply a connected-component algorithm to a binary image consisting of a set of elements at 1 for positions of elements having an opacity attribute, and at 0 otherwise. This leads to a set of opacity particles.

The memory 24 has a zone 42 comprising instruction codes to determine a contour to be assigned to each opacity particle in applying, for example, a growth region algorithm.

The memory 24 has a zone 43 comprising instruction codes to set up a path of the tube 13 and to control a multiplicity of projections along this path. These instruction codes enable the application of a tomography reconstruction algorithm to all the projection images acquired at different angles in order to obtain a reconstructed digital volume comprising 50 to 80 slices for an average breast. The memory 24 has a zone 44 comprising instruction codes to apply a second reconstruction algorithm to all the acquired projection images, this second reconstruction algorithm being further oriented towards a display goal, such as for example the algebraic reconstruction technique, in order to obtain a digital presentation volume.

The memory 24 has a zone 45 comprising instruction codes to apply a display algorithm to the presentation image or to a digital presentation volume. This display algorithm may apply instruction codes of the zone 46 and/or instruction codes of the zone 47. The memory 24 has a zone 46 comprising instruction codes to assign a piece of color information to each element having an opacity attribute. The memory 24 has a zone 47 comprising instruction codes to enhance the signal of the elements having an opacity attribute in the presentation image or the presentation volume.

Figure 9:
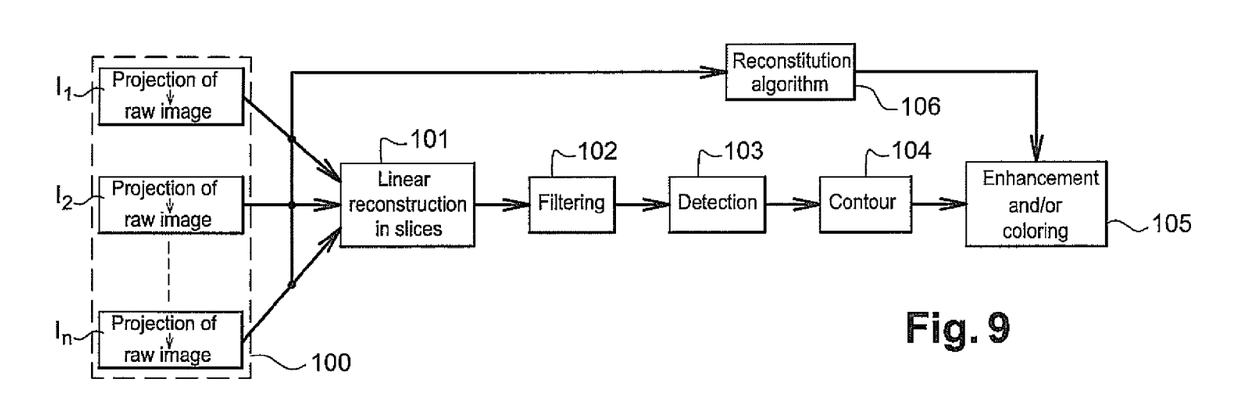
FIG. 9 is an illustration of means implementing an embodiment of the invention.
Figure 10:
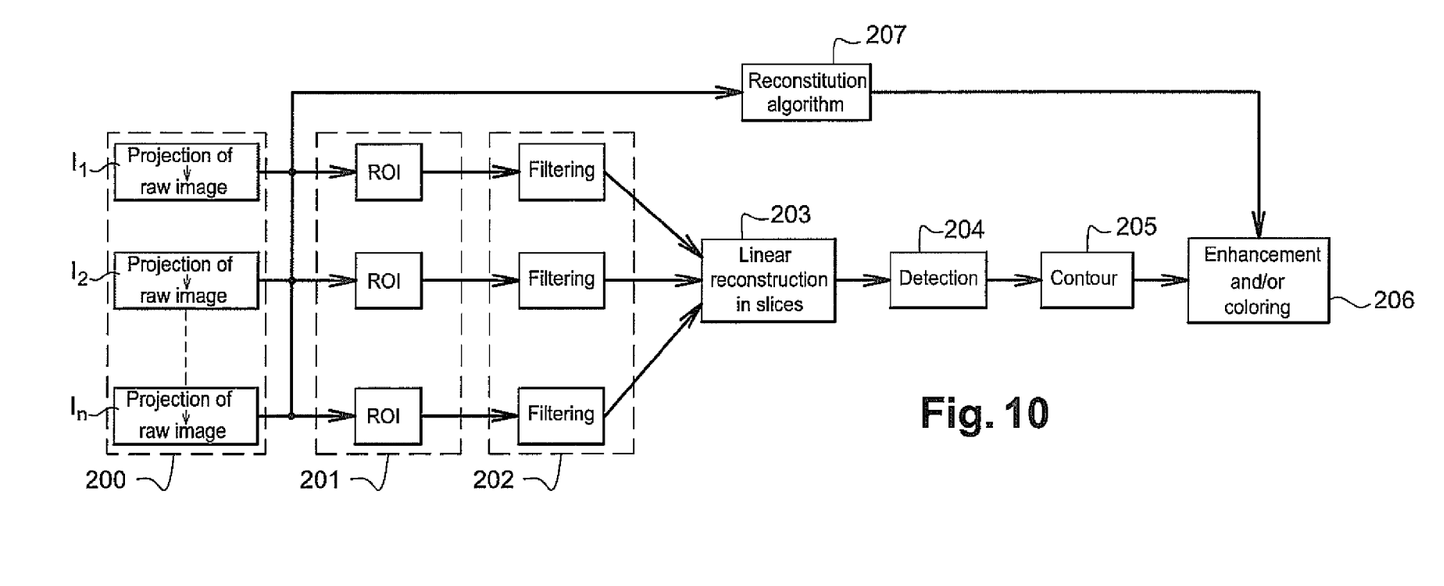
FIG. 10 is an illustration of means implementing another embodiment of the invention.

In one embodiment of the invention, the method of the invention is applied to a raw image which is a 2D image. In this case, the element of the image is a pixel. This embodiment is shown in FIGS. 5 to 8. In other embodiment, the method of the invention is applied to a raw image which is a slice of a digital volume. In this case, the element of the image is a voxel. FIGS. 9 and 10 exemplify these other embodiments.

Figure 5:
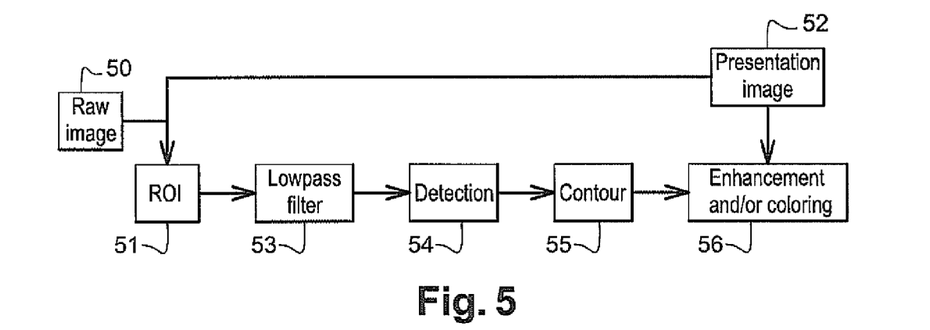
FIG. 5 is an illustration of means implementing the method of the invention.

FIG. 5 illustrates means implementing an embodiment of a method of the invention. FIG. 5 shows a first preliminary step 50 in which the control logic unit acquires a radiography projection of the body. The breast and hence the detector are thus irradiated during this acquisition. The control logic unit produces an image known as the raw image of the projection.

In the step 51, the control logic unit repositions the raw image on the region of interest (ROI). In the step 52, the control logic unit computes the grey level of each element of the repositioned raw image by means of a filter which is preferably a low-pass filter. At the step 53, the control logic unit applies the algorithm of detection of the opacity elements. To do this, it carries out several successive steps.

First step: the control logic unit determines an image resolution value to be applied to the raw image. This resolution is determined as a function of the size of the objects to be detected in the image.

Because of the size of the objects to be detected in various embodiments of the invention, the control logic unit makes the raw image pass into under-resolution. It therefore converts the pixels of the raw image into macro-pixels. Each macro-pixel summarizes the information contained in a set of pixels of at least two pixels. The control logic unit assigns each macro-pixel the mean value of grey levels of the pixels present in said macro-pixel. In a preferred example, each macro-pixel has four pixels.

The control logic unit determines the size of opacity to be detected in a predefined size range. This size varies from 5 millimeters to 3 centimeters in radius. Then, the control logic unit associates the macro-pixels into regions of pixels as a function of the size of the opacity to be detected.

Then, the control logic unit determines the background intensity $I_b$ to be assigned to each region of pixels for each size of the range of sizes of opacity. The control logic unit applies a sliding-window filtering to each region of pixels in order to compute the set of mean values of the grey levels in an immediate environment of each region. This type of sliding-window filtering is described with reference to FIG. 8.

The immediate environment of the regions of pixels is defined as a set of pixels located at a distance equal to 2·R from the pixel situated at the centre of the region, where R is the radius of the opacity to be detected.

The sliding window has the size and shape of the region of pixels. For each position of the sliding window, the control logic unit computes a weighted mean value of the grey levels of the pixels located in the window.

From the set of mean values of grey levels computed in each immediate environment of each region of pixels, the control logic unit selects the mean value of grey levels to be considered as background intensity $I_b$ for each region of pixels. The background intensity $I_b$ is selected in such a way as not to overestimate the contrast of the regions of pixels. To do this, the control logic unit chooses, as background intensity $I_b$, for each region of pixels, the lowest mean value of grey levels among the set of mean values of grey levels computed in each corresponding immediate environment.

Then the control logic unit computes the standardized contrast of each region of pixels as a function of the background intensity $I_b$ estimated for this region. A contrast $\Delta I$ is computed in taking the difference between the mean value of grey levels $I_m$ of the region and the background intensity $I_b$ estimated for this region. The control logic unit standardizes the computed contrast $\Delta I$ of each region as a function of the corresponding estimated background intensity $I_b$ and the size $x_m$ of the opacity to be detected. The standardization defines a difference of attenuation $\Delta\mu$. This difference of attenuation $\Delta\mu$ is equal to $$\Delta\mu = \mu_b - \mu_m \cong \frac{\Delta I}{I_b \cdot x_m}$$

with $\Delta I = I_b - I_m$.

Then, the control logic unit performs a thresholding of the raw image in comparing the standardized contrast of each region of pixels with a predefined standardized contrast threshold $\Delta\mu_{min}$. The control logic unit assigns an opacity attribute to the pixels of the region of pixels whose contrast is above this contrast threshold $\Delta\mu_{min}$. Thus, only the elements for which $\Delta\mu > \Delta\mu_{min}$ for at least one size $x_m$ of opacity to be detected are considered to be opacity elements. $\Delta\mu_{min}$ is a threshold matched according to a truth database.

The algorithm of detection of the opacity elements is repeated as many times as necessary to cover the full range of sizes $x_m$ of opacities.

At the step 54, the control logic unit can optionally determine a contour to be assigned to groups of connected elements having an opacity attribute. This contour is determined according to a known growth region algorithm.

At the step 55, the control logic unit produces a presentation image from the raw image. It is from this raw image that the processing method is used to locate elements liable to constitute opacities. These opacities are enhanced or colored in the presentation image.

At the step 56, the control logic unit applies the display algorithm for displaying elements having an opacity attribute in the presentation image in order to facilitate the practitioner's analysis. This display algorithm may assign a piece of color information to each pixel having an opacity attribute, as well as to its immediate environment.

The display algorithm may also apply an intensity-enhancing process to the pixels having an opacity attribute as well as to their immediate environment. The first step of the enhancement process consists in applying a connected-component algorithm to a binary image formed by a set of pixels at 1 for opacity positions and at 0 elsewhere. This leads to a set of opacity particles. Then, for each pixel of the presentation image belonging to a particle and to its immediate environment, the intensity of the pixel is increased relative to the intensity of the immediate environment of the particle.

The logic control unit computes the mean value of grey levels $M_p$ in the immediate environment of the particle. The immediate environment of the particles is defined as the set of elements located at a distance D from any element of the particle. This mean value of the grey level $M_p$ is the background intensity of the particle. For each pixel (i,j,k) of the particle and its immediate environment, the enhanced image referenced DCA(i,j) is obtained by amplifying the difference between the intensity S(i,j) of the pixel of the particle and the background intensity $M_p$ of the particle according to the following equation:

$$DCA(i, j) = M_P + \left(1 + A \cdot e^{-\frac{d^2}{\tau^2}}\right) \cdot [S(i, j) - M_P]$$

where A directly influences the enhancing power and d is the distance between the pixel (i,j,k) and the particle with d=0 for each pixel inside the particle. Since it is difficult to identify opacity sections, the control logic unit applies an enhancement whose strength diminishes with distance from the particle. The parameter τ controls this reduction of the enhancement factor with distance.

In one example, the opacities are indicated on the presentation image by markers created by the control logic unit. These markers may be a graphic annotation situated at the centre of gravity of the opacities.

Should the display of the results be done by coloring, a color is assigned to the pixels having an opacity attribute as a function of the quantity S(i,j)–$M_p$ and the distance d.

The final presentation image on which the opacity particles have been enhanced or colored is displayed on the display screen for viewing by a practitioner. In this final image, all the opacities have been highlighted without distinction as regards their character of being suspect or benign. Consequently, the radiologist obtains an immediate overall view of the mapping of distribution of the opacities.

Figure 6:
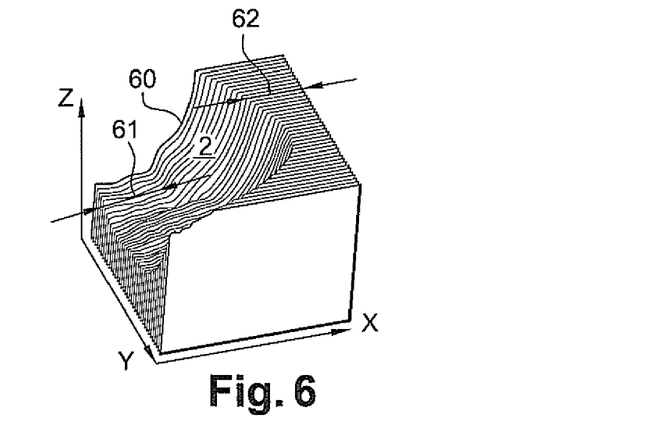
FIG. 6 is a 3D representation of the grey levels of the image of the breast comprising an opacity.

FIG. 6 is a schematic representation in terms of grey levels of the opacity 2 situated close to the boundary of the pectoral muscle 5. This representation is made in Cartesian coordinates X, Y and Z. The opacity 2 is a dense zone corresponding to a sector 60 in which the x-rays are more strongly absorbed than in adjacent stages 61 and 62. In the sector 60, the attenuation of the incident X-rays is greater than in the adjacent structures. This is expressed by a variation of grey levels between the sector 60 and the levels 61 and 62, as can be seen in FIG. 6.

The stage 62 of grey levels represents the attenuation of the tissues in a zone where the thickness crossed is diminished. The state 61 of grey levels represents the attenuation of the tissues in a zone where the thickness crossed remains almost constant.

Figure 7:
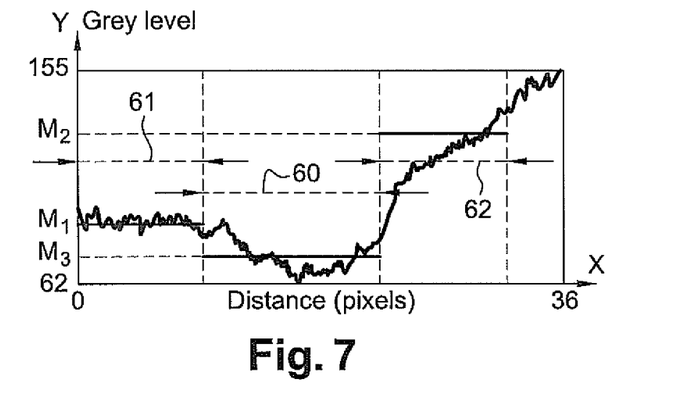
FIG. 7 shows a vertical section of the representation of FIG. 6 going through the opacity.

FIG. 7 is a vertical section of FIG. 6 in the section plane A-A. In the example of FIG. 7, the x-axis X represents a position of the pixel and the y-axis Y represents the grey levels. The opacities are large objects with a diameter varying from 0.5 cm to 3 cm, corresponding to 50 to 300 pixels, it being known that a pixel has a size of 100 µm.

The example of FIG. 7 shows the problem of estimation of background intensity $I_b$ in the prior art, in a one-dimensional case. Indeed, in the prior art, the background intensity $I_b$ is considered to be the mean value of grey levels of the immediate environment of the sector 60. The immediate environment consists of the stages 61 and 62. Consequently, the background $I_b$ is equal to $$I_b = \frac{M_1 + M_2}{2}$$

where $M_1$ is the mean value of grey levels of the stage 61 and $M_2$ is the mean value of grey levels of the stage 62. The fact that the mean value $M_1$ is largely smaller than the mean value $M_2$ gives rise to an over-estimation of the value of the background intensity $I_b$. This over-estimation of the value of the background intensity $I_b$ prompts an over-estimation of the contrast ΔI of the sector 60. This over-estimation of the contrast ΔI of the sector 60 gives rise to a large number of false detections. The practitioner therefore cannot rely on the results given by the prior art algorithms.

To resolve this problem of over-estimation of the background $I_b$, the invention assigns $I_b$ the minimum value between $M_1$ and $M_2$. This technique is generalized in 2D by a sliding-window filtering technique as illustrated in FIG. 8.

Figure 8:
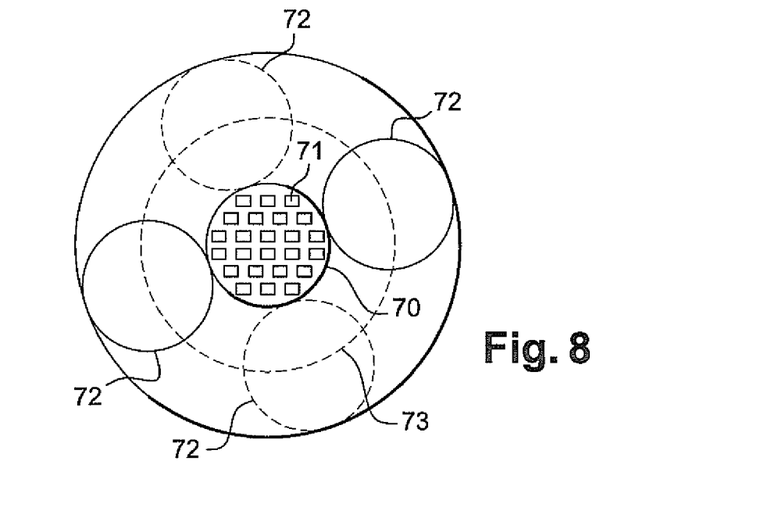
FIG. 8 is a schematic representation of a shift of a sliding window about a region of elements of the raw image of the breast.

FIG. 8 shows a shifting of the sliding window 72 about an immediate environment 73 of a region 70 of pixels. The immediate environment 73 is represented by a circle of dashes in FIG. 8. This region 70 of pixels comprises zones of pixels 71 as a function of the size of the opacity to be detected in a predefined range of opacity sizes. The shape and the size of the region 70 of pixels depend on the shape and the size of the opacity to be detected. In a preferred example, the shape of the region 70 is circular.

To estimate the background intensity $I_b$ of the region 70, the control logic unit uses the sliding-window 72 method. This window 72 has the same shape and the same size as the shape and the size of the region 70 of pixels.

At each position P of the sliding window on the circle of the immediate environment 73, the sliding window 72 computes a weighted mean of grey levels of the pixels present in this window.

As the background value of the immediate environment, the logic control unit chooses the smallest mean value of grey levels corresponding to the most attenuated region among all the mean values of grey levels computed about this circle 73. This mean value of grey levels chosen is considered to be the background intensity $I_b$ of the region 70 of pixels.

FIGS. 9 and 10 show other illustrations of means implementing the image-processing method of the invention, used to locate vowels liable to constitute opacities in a reconstructed volume of the breast. FIGS. 9 and 10 show the use of the opacity-detection method of the invention in a digital image volume.

FIG. 9 shows an embodiment of the invention. In FIG. 9, the X-ray tube 3, in the step 100, emits x-ray intensities going through the patient's breast for a multiplicity of projections P1 to Pn, in a pre-determined path. The detector 14 acquires the raw X-ray images I1 to In respectively representing the projections P1 to Pn. The control logic unit processes the raw X-ray image data I1 to In.

At the step 101, the control logic unit applies a simple back-projection reconstruction algorithm. This algorithm is used to reconstruct the volume in different slice planes parallel to the detector. The term used here is tomosynthesis of the breast. All the raw images I1 to In are used during this tomosynthesis reconstruction to provide a digital volume of the breast. This tomosynthesis technique enables the reconstruction of the 3D volume of the breast being studied from a small number of 2D projections or raw images, distributed on a restricted angular domain and acquired on a digital detector.

After the step 101, the control logic unit applies the steps 102 to 104, corresponding respectively to the steps 52 to 54 of FIG. 5, to each reconstructed slice.

The steps 102 and 103 are repeated as many times as necessary for all the sizes of the range of sizes of opacities.

At the step 105, the control logic unit applies an algorithm for displaying the vowels having an opacity attribute to the presentation volume obtained in the step 106 in order to facilitate the practitioner's analysis. This display algorithm may apply a process of enhancement of the intensity of the vowels having an opacity attribute or can assign a piece of color information to them as well as to their immediate environment.

The first step of the enhancement process consists in applying a 3D connected-component algorithm to a binary volume formed by a set of vowels at 1 for opacity positions and at 0 elsewhere. This leads to a set of 3D particles of opacity. Then, for each voxel of the presentation volume belonging to a particle and to its immediate environment, the voxel intensity is increased relative to the intensity of the immediate surroundings or environment of the particle.

The control logic unit computes the mean of the grey level $M_p$ in the immediate environment of the particle. This mean of the grey level $M_p$ is the background intensity of the particle. For each voxel (i,j,k) of the particle and its immediate environment, the enhanced image referenced DCA(i,j) is obtained by amplifying the difference between the intensity S(i,j,k) of the voxel of the particle and the background intensity $M_p$ of the particle according to the following equation:

$$DCA(i, j, k) = M_P + \left(1 + A \cdot e^{-\frac{d^2}{\tau^2}}\right) \cdot [S(i, j, k) - M_P]$$

where A directly influences the enhancing power and d is the distance between the voxel (i,j,k) and the particle with d=0 for each voxel inside the particle. Since it is difficult to identify sections of opacity, the control logic unit applies an enhancement whose strength diminishes with distance from the particle. The parameter $\tau$ controls this reduction of the enhancement factor with distance.

In one example, the opacities are indicated in the presentation volume by markers created by the logic control unit. These markers may be a graphic annotation located at the centre of gravity of the opacities.

In one variant, the logic control unit can plot a contour around the opacities. This may be of interest if the practitioner's attention needs to be directed more specifically to thee detected lesions.

Should the display of the results be done by coloring the vowels having an opacity attribute, a color is assigned to them as a function of the quantity $S(i,j,k)-M_p$ and the distance d.

The final presentation volume on which the particles of opacities have been enhanced or colored is displayed on the display screen in order to be viewed by a practitioner. In this final volume, all the opacities have been highlighted without distinction as regards their character of being suspect or benign. Consequently, the radiologist obtains an immediate overall view of the mapping of the distribution of the opacities in the volume.

FIG. 10 shows another illustration of means implementing an embodiment of a method of the invention. In the implementation thereof, the image-processing method is applied to each raw image I1 to In, respectively representing each projection P1 to Pn obtained at the step 200. These raw images are given directly by the digital detector to the control logic unit. It is from these raw images that the processing method enables the location of elements likely to form opacities.

At each raw image I1 to In, the control logic unit applies the steps 204 to 206, corresponding respectively to the steps 52 to 54 of FIG. 5.

At the step 203, the control logic unit applies a simple back-projection reconstruction algorithm for reconstructing a digital volume in slices from the filtered raw images.

After the step 203, the control logic unit applies the steps 204 to 206, corresponding respectively to the steps 103 to 106 of FIG. 9, to each reconstructed slice.

The steps 202 to 204 are repeated as many times as necessary for all the sizes of the range of sizes of opacities.

The components and arrangements of the embodiments of the invention, shown and described herein are illustrative only. ΔAlthough only a few embodiments of the invention have been described in detail, those skilled in the art who review this disclosure will readily appreciate that substitutions, modifications, changes and omissions may be made in the design, operating conditions and arrangement of the preferred and other exemplary embodiments without departing from the spirit of the embodiments as expressed in the appended claims. Accordingly, the scopes of the appended claims are intended to include all such substitutions, modifications, changes, and omissions.

What is claimed is:

1. A method for the processing of images produced by an X-ray device, the method comprising:
   computing, from a radiography projection of a body, a raw image of the body;
   computing, for each element of the raw image, a mean grey level characterizing the raw image
   wherein the step of computing for each element of the raw image further comprises:
   a) associating elements of the raw image in regions of elements as a function of the size of the opacity to be detected,
   b) determining a sliding window of a size and shape similar to those of the region of elements,
   c) determining for each region of elements, an immediate environment,
   d) applying the sliding window to each immediate environment of each region of elements, and
   e) computing at each position of the sliding window on each immediate environment, a mean value of grey levels, wherein
   f) the mean value of grey levels to be considered for each region of elements as the background intensity $I_b$ is the lowest mean value of grey levels among the set of mean values of grey levels computed in the corresponding immediate environment.

2. A method according to claim 1, wherein the step of computing for each element of the raw image, further comprises:
   g) computing the contrast of each region of elements by taking the difference between the mean value of the grey levels of the elements of this region of elements and the background intensity $I_b$ assigned to said region of elements.

3. A method according to claim 1, wherein the step of associating the elements in regions of elements comprises the following steps:

choosing an image resolution to be applied to the raw image as a function of the size of the opacities to be detected;

determining a size of opacity to be detected in a range of predefined sizes; and associating elements of said raw image in order to form regions of elements of a size equal to that of the opacity to be detected.

4. A method according to claim 3, wherein the applying a change of resolution to the raw image comprises the following steps:

dividing the raw image into contiguous blocks of elements of the image as a function of the chosen resolution; and forming macro-elements comprising a mean of the grey levels of each corresponding block.

5. A method according to claim 1, wherein the step of computing for each element of the raw image further comprises:

h) computing a difference in attenuation of each region of elements by standardizing the contrast of said region of elements as a function of the size of the opacity to be detected and the background intensity assigned to said region.

6. A method according to claim 5, wherein the step of computing for each element of the raw image further comprises:

i) predefining a contrast threshold;

j) assigning an opacity attribute to the elements of said region, when the standardized contrast of each region is greater than the contrast threshold;

k) determining particles formed by a set of connected pixels having an opacity attribute;

l) evolving the contour of each particle in order to obtain a contour representing the opacity to be detected; and m) displaying elements provided with an opacity attribute in a presentation image produced from the raw image.

7. A method according to claim 6, wherein wherein the step of computing for each element of the raw image, further comprises at least one of:

o) assigning by way of presentation, a piece of color information to elements having an attribute of opacity in the presentation image as well as their immediate environment; or p) enhancing the intensity of the elements having an opacity attribute as well as their immediate environment in the presentation image; and q) displaying the presentation image with the colored or enhanced elements.

8. A method according to claim 1, wherein the step of computing grey levels in each region of elements is performed using a low-pass filter.

* * * * *